(12) United States Patent
Meldahl

(10) Patent No.: US 6,935,512 B1
(45) Date of Patent: Aug. 30, 2005

(54) SHORTENING SAVER

(76) Inventor: Brian Meldahl, 62735-265th St., Brownsdale, MN (US) 55918

( * ) Notice: Subject to any disclaimer, the term of this patent is extended or adjusted under 35 U.S.C. 154(b) by 339 days.

(21) Appl. No.: 10/153,540

(22) Filed: May 22, 2002

(51) Int. Cl.7 .............................................. B07B 13/05
(52) U.S. Cl. ...................... 209/674; 209/675; 209/659; 209/235
(58) Field of Search ............................... 209/674, 675, 209/659, 235

(56) References Cited

U.S. PATENT DOCUMENTS 4,385,703 A * 5/1983 Murphy, II ................. 209/674
5,219,006 A * 6/1993 Bishop ........................ 141/1

* cited by examiner

Primary Examiner—Donald P. Walsh
Assistant Examiner—Jonathan R Miller
(74) Attorney, Agent, or Firm—Nikolai & Mersereau, P.A.

(57) ABSTRACT

A hopper used in conjunction with a deep fryer basket to remove small pieces of the food item, breading or ice crystals from the basket before it is placed in a deep fryer for cooking. Removing the small particles of food prevents them from falling into the shortening and accumulating in the deep fryer. The shortening in the deep fryer will last longer and not discolor when the food items being cooked are totally removed from the shortening after cooking and do not leave behind small pieces of food, breading or water. The hopper when used over a bucket will collect all the small food items, which would otherwise fall into the shortening. The bucket when full can be emptied or replaces with another bucket. The hopper has a lid to engage the bucket and prevent spills or food escaping from the bucket.

2 Claims, 2 Drawing Sheets

SHORTENING SAVER

BACKGROUND OF THE INVENTION

1. Field of the Invention

This invention relates to restaurant food preparation equipment and more particularly to equipment relating to deep fryers for removing ice particles and crumbs from food before placing the food into the deep fryer to save shortening from having crumbs and ice therein.

2. Description of the Related Art

In restaurants using deep fryers such as for the preparation of french fries, onion rings and other fried foods the food items are generally precut and stored in frozen food bags. Some of the food items may be breaded. Many of the food items have small pieces of the food item broken off of larger pieces at the ends or had small pieces of the food item packed into the bag at a food processing facility. It the food was frozen, ice crystals, frost and ice particles, accumulated in the bag or on the food will be present when placing the food items into a deep frying basket for frying the food item in a deep fryer. It the ice, crumbs and small portions of the food item are mixed in or are on the food item when the food item is placed in the frying basket then it will then fall into the shortening in the deep fryer and accumulate therein. The accumulated ice, crumbs and small portions of food items burn in the shortening, cause discoloration of the shortening, and use up the shortening reduce the life of the shortening and increases frequency of the need for changing the shortening in the deep fryer.

SUMMARY OF THE INVENTION

In use, food items are placed in the deep frying basket when the basket is in the shortening saver, comprising a hopper for hanging the basket in, and then shaking the frying basket such that ice, crumbs or small pieces of the food items fall through the hopper and into the bucket. The frying basket is then placed in a deep fryer containing shortening. The shortening save thus prevents unwanted burning of the shortening in the deep fryer. The life of the shortening in the deep fryer is prolonged. The shortening is prevented from burning and discoloration and prolongs the shortening life. Further the deep fryer need not be cleaned as often to remove unwanted particles of food accumulating therein.

The hopper may be placed over a barrel to accumulate the ice, crumb or small pieces of the food items and make it easy to dispose of such items.

OBJECTS OF THE INVENTION

It is an object of the invention to prolong the useful life of shortening in a deep fryer.

It is an object of the invention to extend the time between cleanings of a deep fryer.

It is an object of the invention to prevent discoloration of food items being cooked in a deep fryer.

It is an object of the invention to reduce the cost of preparing food in a deep fryer.

It is an object of the invention to remove unwanted ice or food portions from entering the deep fryer.

It is an object of the invention to make it ease to dispose of unwanted ice or food portions separated from food items about to be deep fried.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
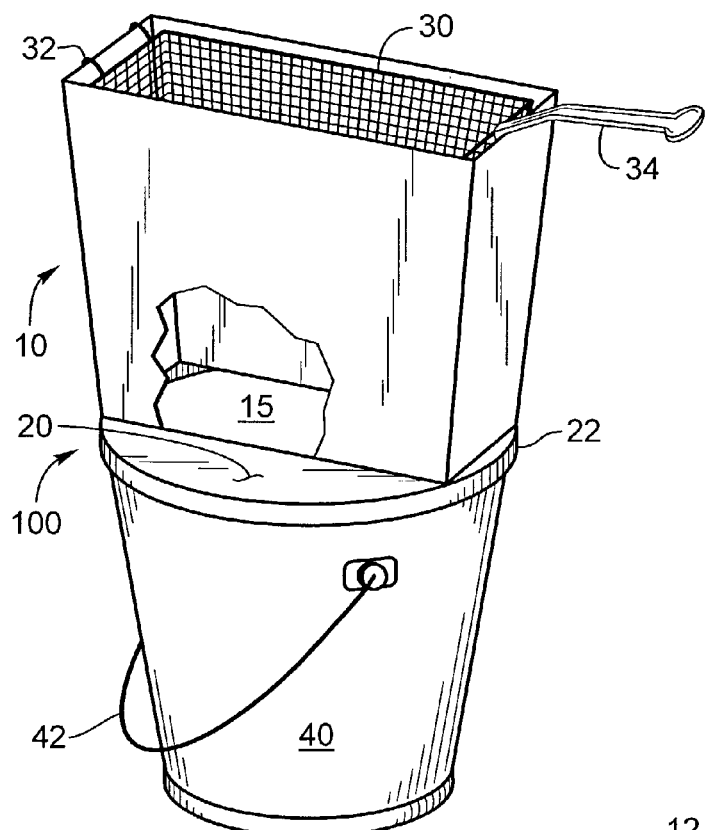
FIG. 1 is a perspective view of the shortening saver on a pickle bucket with a deep frying basket.
Figure 2:
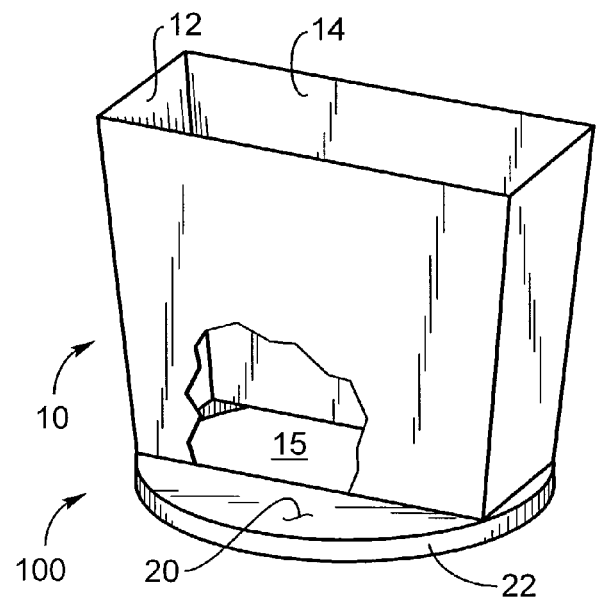
FIG. 2 is a perspective view of the shortening saver.
Figure 3:
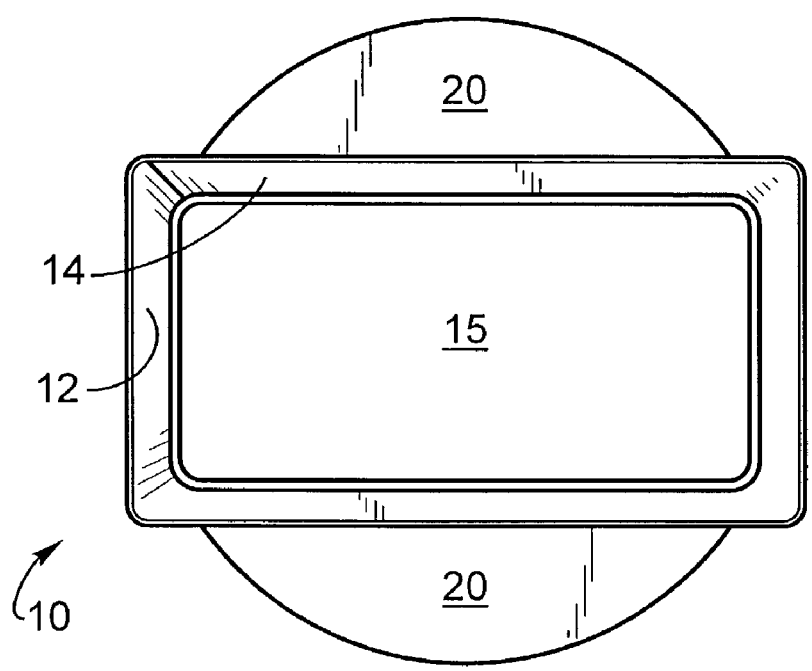
FIG. 3 is a top view of the shortening saver.
Figure 4:
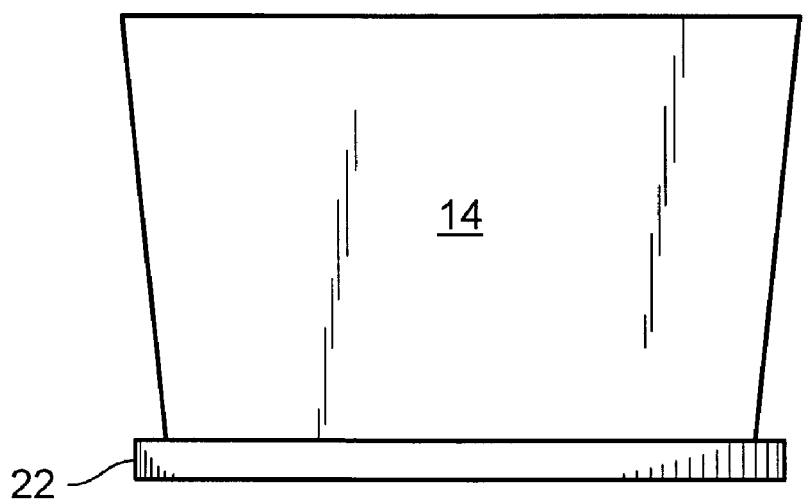
FIG. 4 is a side view of the shortening saver.

FIG. 1 shows a perspective view of the shortening saver 100 resting on a bucket 40. In use a deep frying basket 30 is filled with a food item to be deep-fried. Typically in restaurant food preparation of items such as french fries and onion rings a large bag of a frozen food item is opened a the contents placed into a deep frying basket 30 to be placed into a hot deep fryer filled with shortening to deep fry the food item. This method of cooking the food item deposits loose breading, small broken off pieces of the food item, ice crystals and frost accumulated in the frozen food bag and small pieces of the food item which is too small to stay in the basket while being deep fried into the basket which is immediately placed in the hot shortening of the deep fryer for cooking. The small pieces of food, loose breading, frost and ice crystals will escape the basket contaminate the shortening in the deep dryer and accumulate in the deep fryer. The escaped food particles, are then burned in the deep fryer and soak up shortening. These food items cause the shortening to be discolored. The shortening will then have to be changed more frequently. Further the loose food items accumulating in the deep fryer cause the deep fryer to have to be cleaned more frequently.

As shown in FIG. 1 the food item to be deep fried is placed in a deep frying basket 30 while it is held by a shortening saver 100 which comprises a hopper 10 having a aperture 15 at its base and a lid 20 for supporting the hopper 10 over a barrel 40. In this manner the food items in the basket can be sifted or shaken such that the ice, frost, loose breading, or small pieced of the food item can fall though the deep frying basket 30 fall down through the hopper to the bucket and thus be removed from the food item such that only the food item desired to be cooked is placed in the deep fryer.

The typical deep frying basket 30 has a handle 34 and hooks 32 to rest the basket 30 on the edge of a deep fryer. The hooks 32 on basket 30 can be used to rest the basket on the wall 12 of hopper 10 while a food item is poured into the basket 30 such that the food items will be caught in the basket and small food pieces, loose breading or frost and ice crystals will pass though the basket 30 in hopper 10 and be directed by the side walls 12 and 14 of the hopper 10 trough the aperture 15 in the base of the hopper to a bucket such as a pickle bucket 40 for disposal. In order to facilitate the removal up unwanted frost or food items, the basket 30 can be shaken by the handle 34, while the basket 30 is in the hopper 10. Typically the pickle bucket 40 will have a handle 42 for carrying the bucket 40.

The hopper 10 is attached to a lid 20 having a lip 22 for resting the hopper 10 on the top of the bucket 40. The lid 20 engages the outside perimeter of the hopper to allow the food items to pass though the aperture 15 in the hopper 10. The lip 22 keeps the lid 20 the hopper 10 and its aperture 15 centered over the bucket 40 so that everything falling from the basket 10 accumulated in the bucket to minimize the need to clean the kitchen. The lid 20 prevents food items from bouncing out of the bucket 40.

The shortening saver 100 is easily removed from the bucket 40 when the bucket becomes full and can then be quickly and easily set on top of another bucket 40 for continued use.

The hopper 10 as shown is a trapezoidal pyramid with walls 12 and 14 slanted inward toward aperture 15 however any shape hopper may be used. Similarly although a round pickle bucket 40 has been shown any style or shape of bucket may be used.

In a preferred embodiment the hopper and lid is made by use of a stainless steal material for ease of cleaning and because it is a rust free material. Although stainless steal has been used other materials including aluminum and various plastics may also be used.

Obviously, many modifications and variations of the present invention are possible in light of the above teachings. It is therefore to be understood that, within the scope of the appended claims, the invention may be practiced otherwise than as specifically described.

What is claimed is:

1. A shortening saver comprising:

a hopper having an aperture at the top, an aperture at the bottom, and four sides for enveloping a deep frying basket, one side having a top edge for supporting a deep fryer basket, and one side for supporting a handle on a deep fryer basket, a lid for supporting the hopper attached to the outer perimeter of the bottom of the hopper, the lid having a circular outer perimeter and a lip for resting on a round bucket such that when a food item is added the deep frying basket when it is in the hopper small food pieces and ice crystals will fall through the deep frying basket and into the hopper which directs the food and ice into the bucket.

2. A shortening saver as in claim 1 wherein, the hopper has sloped trapezoidal sides sloping toward each other at the base of the hopper.

* * * * *